April 27, 1954   A. A. WAGNER ET AL   2,676,719
STACKER AND SWEEP-RAKE ATTACHMENT FOR TRACTORS
Filed July 24, 1950   3 Sheets-Sheet 1
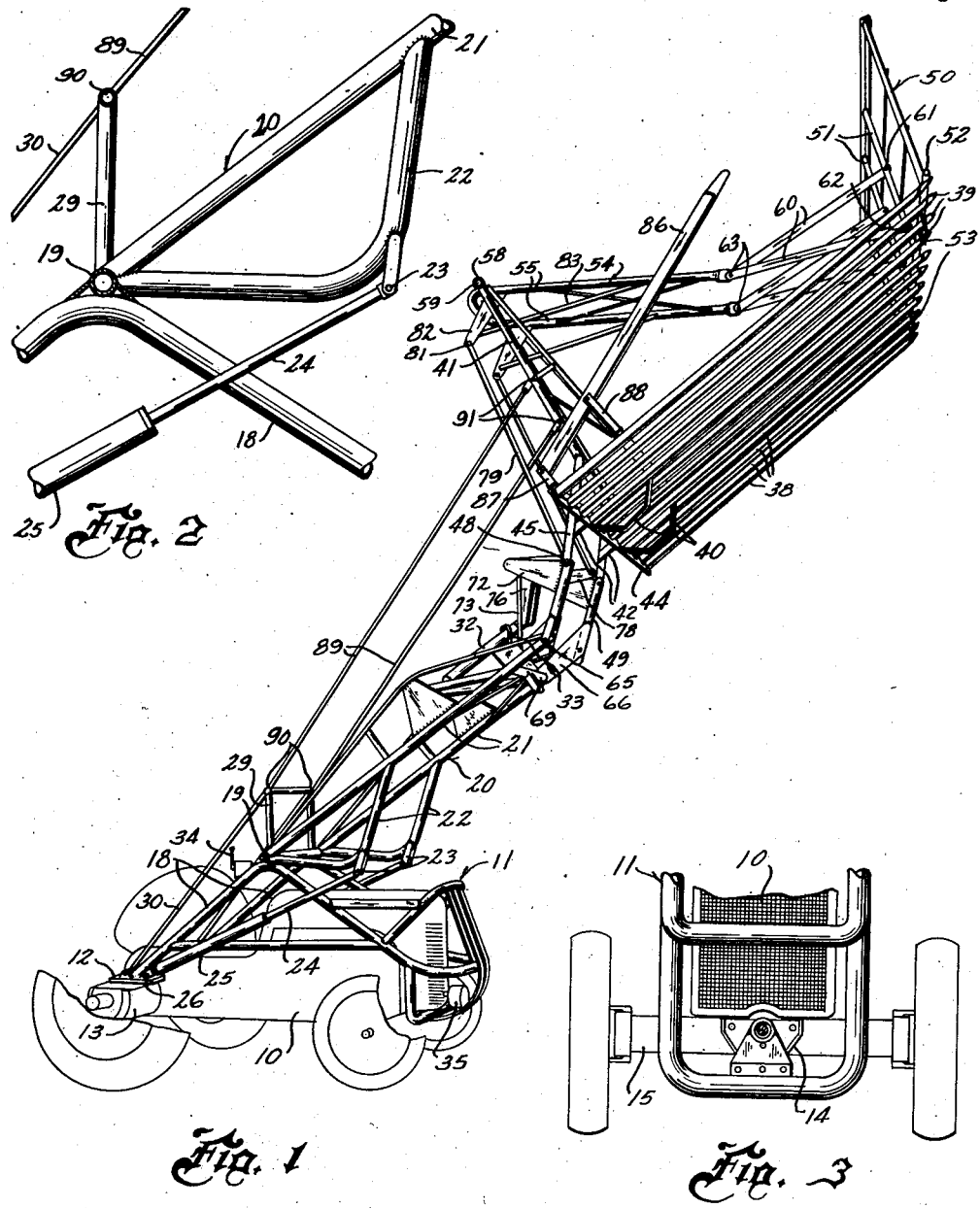
ADOLPH A. WAGNER
ARNOLD J. WERNER
Inventors
By
Wheeler, Wheeler & Wheeler
Attorneys

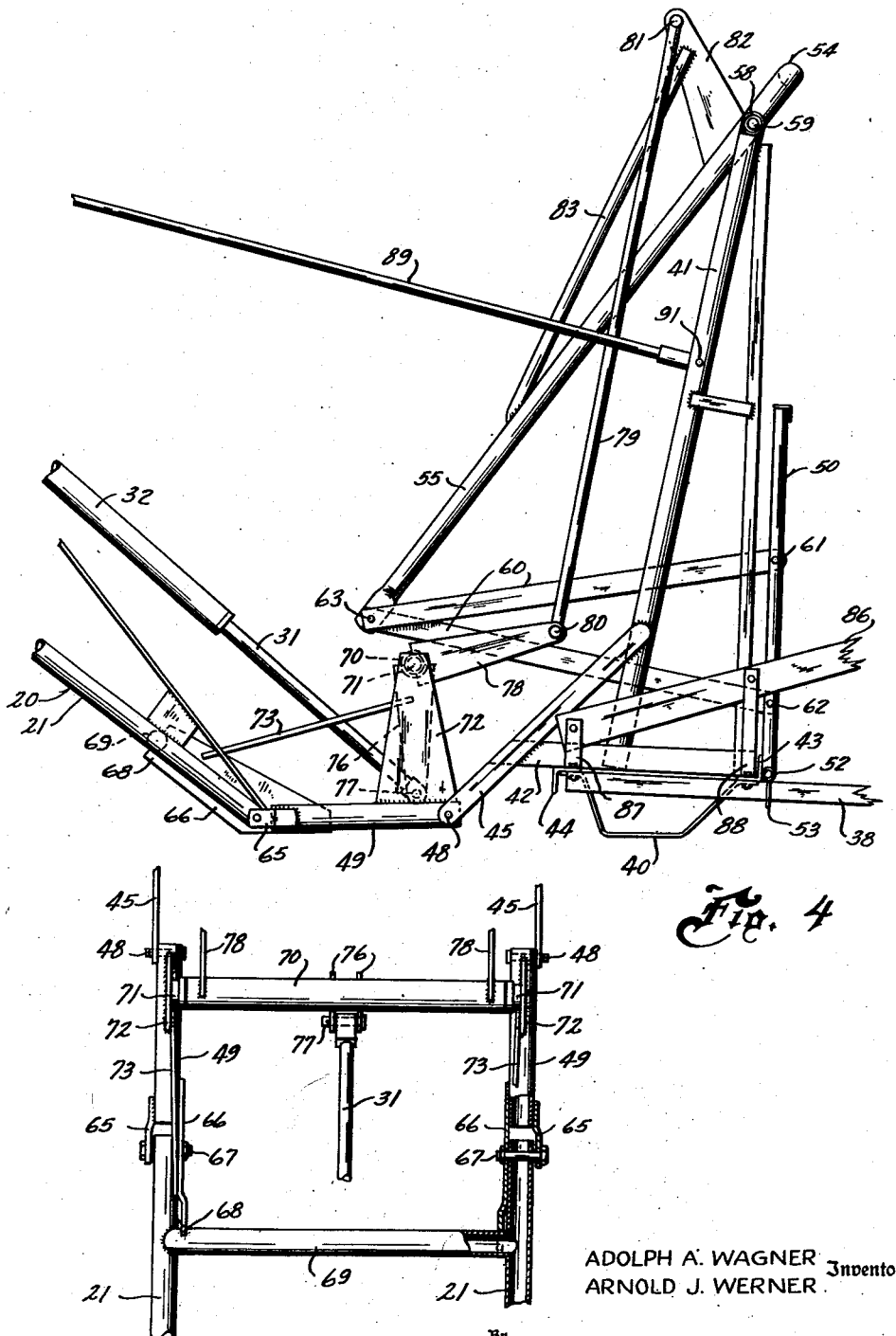

April 27, 1954  A. A. WAGNER ET AL  2,676,719
STACKER AND SWEEP-RAKE ATTACHMENT FOR TRACTORS
Filed July 24, 1950  3 Sheets-Sheet 3

ADOLPH A. WAGNER
ARNOLD J. WERNER   Inventors

By

Wheeler, Wheeler & Wheeler
Attorneys

Patented Apr. 27, 1954

2,676,719

UNITED STATES PATENT OFFICE 2,676,719

STACKER AND SWEEP-RAKE ATTACHMENT FOR TRACTORS

Adolph A. Wagner, Milwaukee, and Arnold J. Werner, Elm Grove, Wis., assignors to Wagner Iron Works, Milwaukee, Wis., a corporation of Wisconsin Application July 24, 1950, Serial No. 175,582

6 Claims. (Cl. 214—510)

This invention relates to a stacker and sweep-rake attachment for tractors.

The principal object of the invention is to provide a materials handling attachment for a conventional farm tractor which adapts the tractor to the powered handling of a variety of farm produce such as hay, straw, grain stock and other material.

It is an object of the invention to provide an attachment of this character which may be utilized interchangeably with other materials handling equipment in conjunction with a boom having a hydraulic power means such as that disclosed in our co-pending application entitled "Hydraulic Front End Attachments for Tractors," Serial No. 148,961, filed March 10, 1950.

Specifically we provide a stacker and sweep-rake combination which is detachably connected to a tractor boom by means of a truss superstructure having fulcrum pivots whereby the raising of the boom will cause the stacker bed to tilt upwardly as it is raised. In this manner the loaded material is restrained from falling from the exposed front end of the stacker and the upward tilt further acts to shift the load toward the center of gravity of the tractor to improve its ground traction and general stability. Moreover, the total height to which the material may be elevated is materially increased by this arrangement.

In its preferred form the stacker is provided with a sweep-rake which is connected by means of novel motion transmitting connections to the hydraulically operable piston on the boom whereby the load may be pushed off or swept from the stacker bed at the control of the operator.

A further object of the invention is to facilitate the detachable connection of the stacker and sweep rake motion transmitting connections with the boom. For this purpose we provide an adapter which is detachably but rigidly connected to the end of the boom and which provides a pivotal connection for the stacker. The adapter is further provided with bell crank apparatus to which the boom piston and the sweep rake motion transmitting connections may be mutually connected for the purpose of transmitting power from the hydraulic piston to the sweep rake.

Other objects and advantages of the invention will be more apparent to one skilled in the art upon an examination of the following disclosure.

In the drawings:

Fig. 1 is a perspective view of a stacker and sweep rake embodying the invention connected to a tractor boom, the apparatus being shown in an elevated position of the boom.

Fig. 2 is an enlarged fragmentary side elevation of the pivotal connections of the boom and superstructure to the tractor base frame.

Fig. 3 is an enlarged fragmentary front elevation of the base frame connection to the tractor.

Fig. 4 is an enlarged fragmentary side elevation showing the inter-connected parts of the boom, adapter and stacker sweep rake.

Fig. 5 is a plan view of the adapter showing its detachably rigid connection with the boom and the disposition of the bell crank arms respecting the boom piston.

Figure 6:
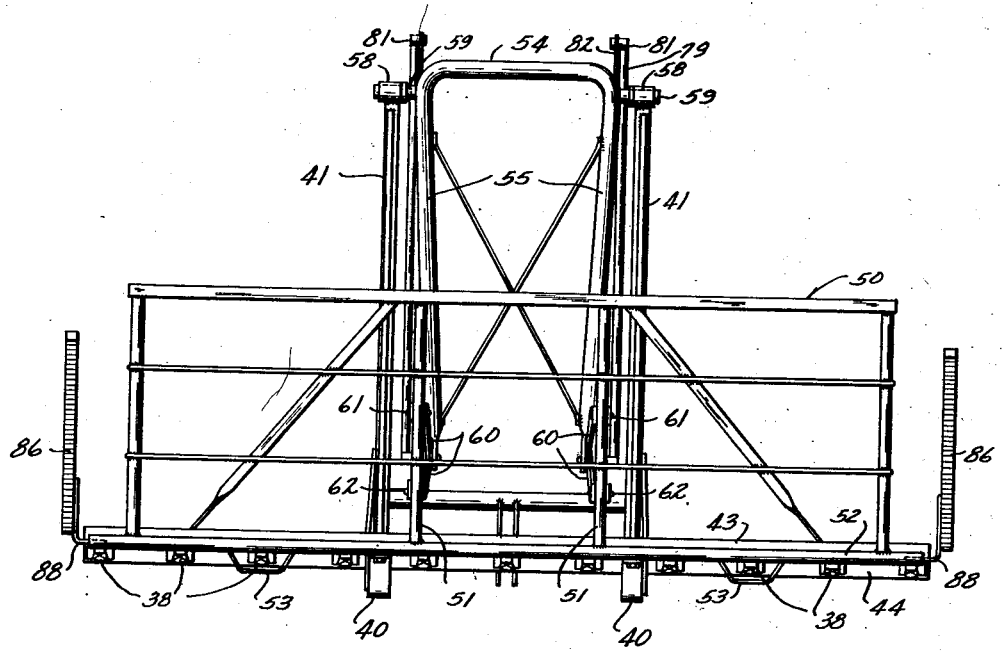
Fig. 6 is a front elevation of the stacker and sweep rake.

As more fully described in our co-pending application above referred to, apparatus with which the combined stacker and sweep rake may be interchangeably usable comprises a tractor 10 provided with a base frame indicated generally as 11. The base frame has paired rear shoes 12 secured near the respective ends of the tractor rear axle 13. A bracketed connection 14 with the front axle 15 of the tractor completes the secure but detachable emplacement of the base frame on the tractor. The base frame further comprises paired side A-frames 18 which are respectively provided with aligned sockets 19 upon which a boom indicated generally as 20 is pivoted.

The boom is generally of the same type disclosed in our aforenoted co-pending application and comprises spaced lever arms 21 having underslung elbows 22 provided with pivotal connections 23 to paired piston rods 24 which are reciprocal in the hydraulic cylinders 25. The cylinders are pivotally connected at 26 to the paired mounting shoes 12 of the base frame and receive fluid from the pump 35 via control 34.

The base frame 11 is further provided with an upstanding mast 29 comprising uprights braced from the rear mounting shoes 12 by paired rods 30. The mast serves as a fixed anchor to which is pivoted a truss superstructure to be hereinafter described more in detail.

The boom is provided at its front end with a hydraulically actuated piston having an extensible piston rod 31 reciprocable in the cylinder 32. The cylinder 32 is desirably mounted midway between the parallel levers 21 of the boom. As is more fully described in our aforenoted co-pending application the hydraulic cylinder 32 is supplied with hydraulic fluid through the lines 33 which are connected through the control 34 to receive pressurized hydraulic fluid from the pump 35. In the embodiment shown the pump is driven from the crank shaft of the tractor engine although any other source of fluid under pressure would be acceptable so far as the present invention is concerned.

Figures 7, 8:
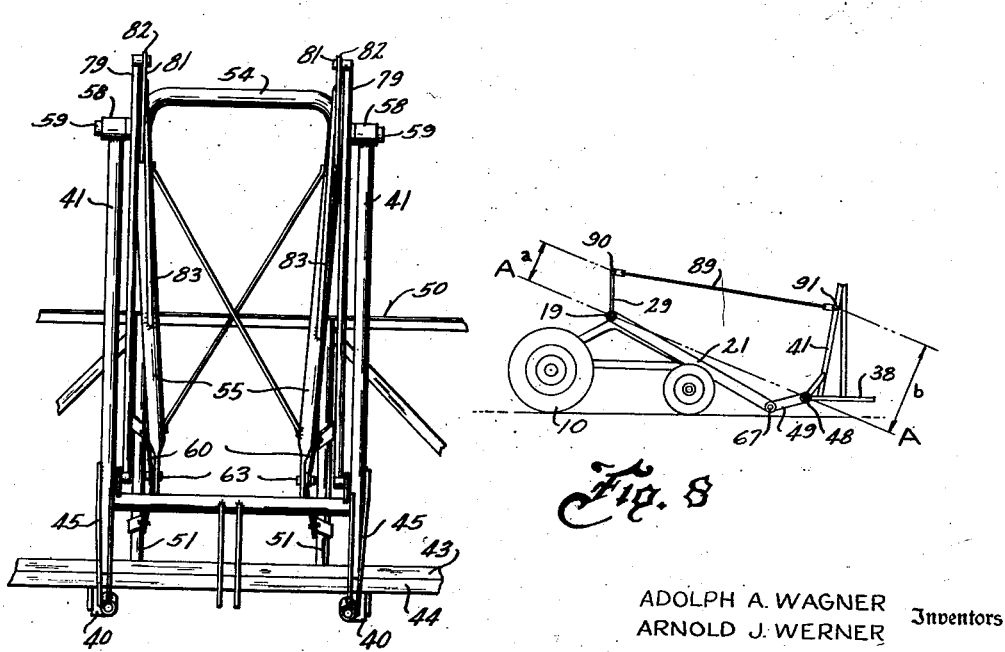
Fig. 7 is a fragmentary rear elevation of the stacker and sweep rake.
Fig. 8 is a diagrammatic showing of the novelly positioned furcrum pivots whereby the stacker is tiltably supported by the boom and truss superstructure.

The stacker and sweep rake attachment comprises a materials supporting bed or platform composed of spaced forwardly projecting slats or tines 38 which may be made of hard wood or the like tipped with steel caps 39. The tines are mutually connected by laterally extending spaced rear angle iron 44 and intermediate angle iron 43 to which each tine is bolted (Fig. 4). The rear of the stacker bed is provided with spaced skid shoes 40 upon which the stacker is supported when in ground contact as shown in Fig. 8.

The stacker further comprises laterally spaced uprights or standards 41 which are each desirably secured to the bed by welded connection to tie pieces 42 which span the lateral angle irons 43 and 44, and also form the bases of the respective A-frames.

The stacker is pivotally connected to the boom by means of dual laterally spaced upwardly inclined brackets 45 which are respectively welded both to the uprights 41 and the tie members 42. The oblique brackets 45 extend rearwardly of the platform bed to a pivotal connection at 46 with a special adapter frame 49, to be hereinafter described more in detail, which is detachably rigid with the boom.

The stacker carries a sweep-rake, indicated generally as 50, having spaced centrally disposed upright members 51 and a cross member 52 riding on the tines 38. The cross member 52 is provided with guide loops 53 which embrace certain of the tines 38 for the purpose of guiding the rake in its longitudinal sweep motion over the stacker bed, and to prevent the rake from being separated from proximity with the bed.

The sweep-rake is moved along the stacker bed by means of a motion transmitting linkage system including a U-shaped lever 54 having substantially parallel legs 55 (Figs. 1 and 6). The lever 54 is pivoted near its top to spaced aligned sockets 58 at the respective tops of the spaced upright stacker standards 41. The lever pivot is provided by axially aligned stub shafts 59 which oscillate in bearing relation within the sockets 58.

As indicated the U-shaped lever is swingable upon its stub shafts 59 between the respective uprights or standards 41. In the course of their swinging movement the lever legs 55 describe arcs in planes longitudinal respecting the stacker, being movable from the retracted position shown in Fig. 4 to the advanced position shown in Fig. 1. The free ends of the respective lever arms 55 pivotally carry link elements 60 upon the pins 63. The links 60 are connected in bracing relationship to the upright frame members 51 of the sweep-rake 50. As indicated in Figs. 1 and 4, the connection of the link members 60 with the frame members 51 is desirably widely spaced, as at 61 and 62, whereby to hold the rake relatively upright in the course of its movements between the positions respectively shown in Figs. 1 and 4. The links 60 are shown to occupy a triangle defined by the fixed connection 61, 62 and the pivot 63. Any link having a pivotal connection with lever 55 and braced connection with rake 50 would be acceptable, however.

For the purpose of facilitating connection with the hydraulically actuated piston 31 of the lever arms 55, whereby to sweep the rake 50 along the stacker, novel mechanical linkage between the piston rod 31 and lever arms 55 is provided. This mechanical linkage is desirably provided in conjunction with the adapter frame 49 which is specifically provided to facilitate attaching the stacker and sweep-rake attachment to the boom interchangeably with other material handling equipment which may also be attached to the boom. Incorporation of the linkage terminal connections with the adapter enables all connections to be made at the adapter, thereby facilitating interchange of attachments.

As best shown in Fig. 5 the adapter 49 desirably comprises spaced side frame members which respectively carry mutually spaced outside rearwardly extending brackets 65 and inside rearwardly extending stabilizing members 66. Through aligned holes in the respective pairs of brackets 65 and plates 66 removable bolts or pins 67 are positioned to engage the apertured ends of the respective lever arms 21 of the boom. The stabilizing members 66 are further extended rearwardly of the pins 67 where they are provided with forked ends 68 which embrace a cross member 69 upon the boom. In this manner the adapter 49 is restrained from oscillation about the pins 67 when detachably engaged with the boom. As before stated the forward ends of the frame members 49 carry the stacker for pivotal movement upon the brackets 45 and pins 46.

The adapter frame 49 further carries an elevated transverse tube or shaft 70 which is desirably journaled on axle 71 which is supported upon the respective upstanding brackets 72 which are welded or otherwise fixed at each side of frame 49. The upstanding brackets 72 are braced by rods 73 which extend rearwardly from the respective brackets 72 to a fixed connection with the respective stabilizing plates 66.

Shaft 70 acts as a pivot for a bell crank which is part of the motion transmitting connections between the piston rod 31 and the sweep-rake lever 55. The bell crank comprises closely spaced arms 76 welded to the tube 70 near its mid-point and having mutually spaced free ends pivotally connected at 77 to the piston rod 31. The bell crank further comprises widely spaced arms 78 which are angularly offset respecting arms 76 and are respectively disposed near the ends of the shaft 70 so as to substantially align, in the course of their rotation, with the sweep-rake lever arms 55.

The respective sweep-rake levers 55 also comprise arms of a second bell crank, arms 82 welded to the levers near their pivot 59 comprising the other arm. The respective bell crank arms 82 are made rigid with the levers 55 by the braces 83. Links 79, which pivot to the arms 78 at 80 and to the arms 82 at 81, transmit motion between the two bell cranks. An important feature of the motion transmitting connection of the piston to the rake is that the distance between the pivots 81 on the bell crank arms 82 from the stub shaft 59 is substantially less than the distance from the stub shaft 59 to the pivots 63 to which the sweep-rake links 60 connect. A motion multiplying mechanical advantage is thereby introduced into the system.

From the foregoing it is seen that the preferred motion transmitting connections comprise a first bell crank with arms 76 and 78 pivoted upon the tube 70 and a second bell crank comprising arms 55 and 82 pivoted about the axially aligned stub shafts 59. By reason of the construction of the second bell crank wherein the arm 82 is substantially shorter than the arm 55 a mechanical advantage is obtained in the second bell crank whereby the motion imparted to the bell crank from piston 31 is multiplied. In this manner relatively short movements of the piston rod 31 within its cylinder 32 will sweep the rake over the entire length of the stacker bed.

In order to better retain loosely bound material on the stacker, side members 86 are provided which extend upwardly and outwardly from near the rear base of the stacker. Angle bracket mountings 87 and 88, which are respectively connected to the platform angle irons 44 and 43, mount the side members 86.

A novel feature of the invention resides in the positioning of the fulcrum pivots upon which the stacker is supported from the tractor whereby the stacker will tilt upwardly as the forward end of the boom is swung upwardly about its pivot 19. For this purpose we provided a superstructure comprising paired truss members 89 pivoted at 90 to the upstanding mast 29 which is rigid with the base frame 11. The respective truss members 89 are further pivoted to the respective upright standards or A-frames 41 of the stacker on pivots 91. As best shown in the diagrammatic view of Fig. 8 the trusses 89 and a line A—A drawn from pivot 19 of the boom to pivot 48 on the adapter (this line A—A being the effective arm of the combined boom and adapter), are non-parallel. The distance between the pivots 19 and 90 on the mast 29, indicated by the dimension line a, is substantially less than the distance between the pivots 48 and 91 on the stacker, indicated by dimension line b. In practice a satisfactory ratio of distance a and b has been found to be 1 to 3, although any construction wherein distance a is substantially less than distance b would be acceptable. Because of this disparity in distances a and b, the raising of the boom will cause the pivots 91 to move rearwardly respecting pivots 48, with a corresponding upward tilt being imparted to the bed or tines 38 of the stacker. In this manner the carried load will tend to gravitate to secure position on the stacker and the weight of the load will be shifted toward the center of gravity of the tractor during bodily upward movement of the tines and load. Improved tractor traction and stability are thereby achieved. At the maximum elevation of the tines however, the tips of the tines will be very much higher than as if they were horizontal and the final elevation of the load is achieved by the sweep as it pushes the load from the upper tips of the tines.

From the foregoing description taken in connection with the accompanying drawings, it is seen that a materials handling attachment has been provided which has a unique upwardly tilting action as it is raised upon the tractor boom. The attachment is provided with a sweep-rake powered from the hydraulically actuated piston on the boom, and the tractor is provided with an adapter which facilitates quick interchange of the stacker and sweep rake combination with other tractor attachments and which also provides for rapid interconnection of the terminal connections of the motion transmitting connections from the piston to the sweep rake.

We claim:

1. A materials handling attachment for a tractor, said attachment comprising a boom, a load supporting platform pivotally connected to the boom, said platform being provided with an ejector positioned to sweep material off the platform, a hydraulic motor on the boom, and motion transmitting connections from the motor to the ejector, said motion transmitting connections comprising a rotor and a mounting for the rotor on which it is rotatable on an axis transverse to the direction of motor movement, and bell crank members on the rotor, said bell crank members being respectively connected to the motor and to the ejector, said motion transmitting connections further comprising a second bell crank on the platform, said second bell crank having a first arm linked with an arm of the first mentioned bell crank and a second arm linked with the ejector, said second arm being of greater length than said first arm whereby to multiply motion from the piston to the ejector.

2. The device of claim 1 wherein the mounting for the rotor comprises an adapter frame separately applicable to the boom and having detachable pivotal connection with the platform.

3. A stacker attachment for a tractor provided with a boom pivoted thereto, a mast connected to the tractor and extending above the pivotal connection of the boom to the tractor, truss links pivoted to the mast above said pivotal connection, an adapter frame detachably rigidly connected to the boom, said stacker being pivotally connected to the adapter frame and to the truss links, a sweep-rake on said stacker, said boom being provided with a hydraulic motor, said adapter frame being provided with motion transmitting connections between said motor and sweep-rake whereby the rake is actuated by the motor, said motion transmitting connections comprising means for transmitting motion from the motor to the sweep-rake regardless of the pivotal position of the stacker respecting the boom and truss links, said connections being detachable from the motor whereby removal of the stacker attachment and adapter from the boom leaves the motor free for connection to an implement substituted for the stacker and adapter, said motion transmitting connections including a bell crank on the adapter frame and a bell crank on the stacker, one of said bell cranks having arms of unusual length whereby crank motion imparted by the piston to the rake is multiplied.

4. The combination with a base frame removably attached to a tractor, a boom pivotally attached to the base frame and a mast rigid with the base frame and extending upwardly substantially above the boom pivot, of a materials handling attachment pivotally supported from the free end of the boom, said attachment comprising a platform and an upright standard, a truss pivoted to the mast and to said upright standard, the distance between the truss pivot to the mast and boom pivot to the base frame being less than the distance between the truss pivot to the standard and the boom pivot to the attachment, in further combination with an adapter which provides the boom pivot to the attachment, said adapter comprising a framework detachably rigidly connected to the boom, said attachment further comprising a sweep-rake having a lever pivotally mounted to an upright and swingable longitudinally of the platform, said boom being provided with a hydraulically actuated piston and motion transmitting connections from said piston to said lever, whereby said sweep-rake is hydraulically actuated, and a mounting on said adapter for said motion transmitting connections.

5. The device of claim 4 wherein said motion transmitting connections include a transverse rotor supported from the adapter, said rotor being provided with bell crank elements respectively connected to said piston and lever.

6. An attachment for a boom having a pivotal connection with a tractor and having a hydraulic motor near its free end, said attachment comprising an implement having an adapter frame detachably connected rigidly with the free end of the boom and having load supporting means which is forwardly open for load discharge, a load discharging means movable forwardly over said supporting means to deliver a load from the open end thereof, a link connection to said implement for maintaining said supporting means in predetermined positions in the raising and lowering of the boom, the implement being in pivotal connection with the adapter frame, and motion transmitting connections to the load discharging means from the said motor for operating the discharging means in any pivotal position of the implement and including linkage on the implement and a rock shaft on the adapter frame having an arm detachably connected with the motor, whereby removal of said attachment includes removal of the rock shaft with the adapter frame, leaving said motor free for use with a different attachment.

References Cited in the file of this patent

UNITED STATES PATENTS

| Number | Name | Date |
| --- | --- | --- |
| 1,175,792 | Mickelsen | Mar. 14, 1916 |
| 2,409,302 | Millikin | Oct. 15, 1946 |
| 2,415,515 | McOscar | Feb. 11, 1947 |
| 2,418,661 | Palm | Apr. 8, 1947 |
| 2,446,938 | Losch | Aug. 10, 1948 |
| 2,449,212 | Fraga | Sept. 14, 1948 |
| 2,485,110 | Pokorny | Oct. 18, 1949 |
| 2,493,397 | Fourman | Jan. 3, 1950 |
| 2,495,143 | Simmonds | Jan. 17, 1950 |
| 2,496,039 | Crawford | Jan. 31, 1950 |
| 2,497,385 | Young et al. | Feb. 14, 1950 |
| 2,542,150 | Luebbers | Feb. 20, 1951 |